(12) United States Patent
Hong et al.

(10) Patent No.: US 12,007,351 B2
(45) Date of Patent: Jun. 11, 2024

(54) ELECTRODE-MODIFIED HEAVY METAL ION MICROFLUIDIC DETECTION CHIP AND PREPARATION METHOD

(71) Applicants: Jiangsu Yangtze Testing and Certification Co., Ltd., Jiangsu (CN); Jinling Customs Technnology Center, Jiangsu (CN)

(72) Inventors: Ying Hong, Jiangsu (CN); Jiansong Chen, Jiangsu (CN); Juan Huang, Jiangsu (CN); Yangyun Wu, Jiangsu (CN); Lingling Tian, Jiangsu (CN); Wei Wang, Jiangsu (CN); Wei An, Jiangsu (CN); Jingling Wang, Jiangsu (CN); Yuanyuan Zhu, Jiangsu (CN); Chen Tang, Jiangsu (CN)

(73) Assignees: JIANGSU YANGTZE TESTING AND CERTIFICATION CO., LTD., Jiangsu (CN); JINLING CUSTOMS TECHNNOLOGY CENTER, Jiangsu (CN)

( * ) Notice: Subject to any disclaimer, the term of this patent is extended or adjusted under 35 U.S.C. 154(b) by 51 days.

(21) Appl. No.: 17/774,174

(22) PCT Filed: Mar. 27, 2020

(86) PCT No.: PCT/CN2020/081674
§ 371 (c)(1),
(2) Date: May 4, 2022

(87) PCT Pub. No.: WO2021/088304
PCT Pub. Date: May 14, 2021

(65) Prior Publication Data
US 2022/0349852 A1    Nov. 3, 2022

(30) Foreign Application Priority Data

Nov. 4, 2019   (CN) .......................... 201911064127.9

(51) Int. Cl.
*G01N 27/30* (2006.01)
*B01L 3/00* (2006.01)
(Continued)

(52) U.S. Cl.
CPC ...... *G01N 27/308* (2013.01); *B01L 3/502715* (2013.01); *B29C 64/112* (2017.08);
(Continued)

(58) Field of Classification Search
None
See application file for complete search history.

(56) References Cited

U.S. PATENT DOCUMENTS

2017/0089861 A1* 3/2017 Chen ...................... G01N 27/48

FOREIGN PATENT DOCUMENTS

| CN | 203484166 U | 3/2014 |
|----|-------------|--------|
| CN | 105223259 A | 1/2016 |

(Continued)

OTHER PUBLICATIONS

Gawli, Y., et al.; "Evaluation of n-type ternary metal oxide NiMn2O4 nanomaterial for humidity sensing;" Sensors and Actuators B: Chemical; 2014; pp. 837-843. (Year: 2014).*

(Continued)

*Primary Examiner* — Matthew D Krcha
(74) *Attorney, Agent, or Firm* — McClure, Qualey & Rodack, LLP

(57) ABSTRACT

An electrode-modified heavy metal ion microfluidic detection chip, comprising a microfluidic module (1) and a three-electrode sensor (2), wherein the microfluidic module (1) is integrally molded by 3D printing, and the interior thereof has a microchannel (10) and a sensor slot (11); and the three-electrode sensor (2) comprises three electrodes (21, 22, 23) printed on a card-shaped bottom plate (20), among which the working electrode (21) is a porous nano- (Continued)

NiMn2O4 modified bare carbon electrode, and the three-electrode sensor (2) is inserted into the sensor slot (11) that matches same to form the microfluidic detection chip.

9 Claims, 7 Drawing Sheets

(51) Int. Cl.
| | | |
|---|---|---|
| B29C 64/112 | (2017.01) | |
| B29C 64/30 | (2017.01) | |
| B33Y 10/00 | (2015.01) | |
| B33Y 40/20 | (2020.01) | |
| B33Y 80/00 | (2015.01) | |
| B41M 1/12 | (2006.01) | |
| B41M 1/30 | (2006.01) | |
| B41M 3/00 | (2006.01) | |
| G01N 27/333 | (2006.01) | |
| G01N 27/48 | (2006.01) | |
| B29L 31/00 | (2006.01) | |

(52) U.S. Cl.
CPC .............. *B29C 64/30* (2017.08); *B33Y 10/00* (2014.12); *B33Y 40/20* (2020.01); *B33Y 80/00* (2014.12); *B41M 1/12* (2013.01); *B41M 1/30* (2013.01); *B41M 3/006* (2013.01); *G01N 27/333* (2013.01); *G01N 27/48* (2013.01); *B01L 2300/0645* (2013.01); *B01L 2300/0816* (2013.01); *B01L 2300/16* (2013.01); *B29L 2031/752* (2013.01)

(56) References Cited

FOREIGN PATENT DOCUMENTS

| CN | 107367542 A | 11/2017 |
|---|---|---|
| CN | 107505381 A | 12/2017 |
| CN | 109534412 A | 3/2019 |
| CN | 110756234 A | 2/2020 |
| IN | 107367542 A | 11/2017 |
| JP | 2005031050 A | 2/2005 |
| KR | 20180004691 A | 1/2018 |

OTHER PUBLICATIONS

International Search Report Issued in Application No. PCT/CN2020/081674.
Chinese Language Search Report issued in Application 2019110641279.
English Translation of Search Report issued in Application 2019110641279.
Chinese Language Office Action dated Apr. 3, 2020 issued in Application 2019110641279.
English Language Translation of Office Action dated Apr. 3, 2020 issued in Application 2019110641279.
Chinese language amendment/response filed in response to Office action mailed Apr. 3, 2020 issued in Application 2019110641279.
English Language Translation of amendment/response filed in response to Office action mailed Apr. 3, 2020 issued in Application 2019110641279.
Chinese Language Office Action dated Jun. 18, 2020 issued in Application 2019110641279.
English Language Translation of Office Action dated Jun. 18, 2020 issued in Application 2019110641279.
Chinese language amendment/response filed in response to Office action mailed Jun. 18, 2020 issued in Application 2019110641279.
English Language Translation of amendment/response filed in response to Office action mailed Jun. 18, 2020 issued in Application 2019110641279.
Claim replacement sheet issued in Chinese application (No. 2019110641279).
English Language Translation of Claim replacement sheet issued in Chinese application (No. 2019110641279).
Chinese Language Notice of Allowance dated Aug. 5, 2020 issued in Application 2019110641279.
English Language Translation of Notice of Allowance dated Aug. 5, 2020 issued in Application 2019110641279.
Kong, B.; "development and applications of novel ChemoBioanalytical methods and modeling algorithms for analytical data processing;" 2007; pp. 1-145.
Zhi, J., et al.; "Fabrication and application of two-dimensional gold nanoelectrodes array based boron doped diamond electrode;" China Academic Journal Electronic Publishing House; pp. 678-679.
Qiao, S., et al.; "Nickel-Manganese Binary Metal Oxide as Electrode Materials for supercapacitors;" Progress in Chemistry; 2019; pp. 1177-1186.
English Language Translation of the Abstract of "Nickel-Manganese Binary Metal Oxide as Electrode Materials for supercapacitors" (p. 1).

* cited by examiner

ELECTRODE-MODIFIED HEAVY METAL ION MICROFLUIDIC DETECTION CHIP AND PREPARATION METHOD

TECHNICAL FIELD

The present invention relates to the technical field of electrochemical detection, especially an electrode-modified heavy metal ion microfluidic detection chip. The present invention further provides a preparation method of the microfluidic detection chip.

BACKGROUND TECHNOLOGY

With development of Internet industrialization and industrial intelligentisation, amounts of electronic and electric products are increasing explosively, while enjoying new lifestyles brought by modern sciences and technologies and ecommerce, we are also facing more and more threats caused by electronic wastes to our living environment. Heavy metals are one of the prevailing pollutants among electronic wastes, exist widely in electric and electronic products, and the heavy metals will enter earth, water and air and cause direct pollution or indirect pollution by mitigation between different environments once raw materials, products and wastes are not properly disposed. As the heavy metals are not degradable nor liable to mitigate, when being enriched, taken by human bodies and accumulated in organs, it is difficult to export the heavy metals in human bodies, and the heavy metals in the human bodies are liable to bond with proteins and enzymes and result in inactivation of the proteins and enzymes, chronic intoxication and other serious illness can occur and damages that are hard to assess can be caused to wellbeing of the human bodies. Therefore, many countries have exerted strict management over poisonous and hazardous pollutant in electric wastes, especially heavy metal ions, and higher and higher requirements are raised to detection technologies of heavy metal contents in all kinds of media.

Among the prior art, the detection technologies of heavy metal contents in different media can be generally divided into three categories: spectrum analysis, electrochemical analysis and biochemical analysis. Among them, instruments used in electrochemical analysis are relatively smaller, cheap, and it is easy to realize micromation and integration of the detection devices, which are flexible and adaptive, and electrochemical analysis has gradually become an emphasis of analysis instrument researches. In anodic stripping voltammetry (ASV) in the electrochemical analysis, qualitative and quantitative analysis of metal ions in solutions is conducted based on specific oxidation or stripping spike potentials of each metal, and ASV is a method very suitable for use in trace amount heavy metal detection. Conventional ASV uses a system comprising three bar-shaped electrodes for determination, during detection, a demand of sample piece solution is large, pre-electrolysis time is long, and reproducibility of the detection results is poor, as a result, ASV shall not be used as a quick on site detection solution.

In recent years, development of microfluidic chip technologies has started a new way for development of ASV. In microfluidic chips, micro-channels are patterned in small base materials, and other functional units, including sample transportation units, pre-processing unit, reaction units, separation units, optical or electric response detection units are integrated in the chips, and due to miniaturization of the microfluidic chips, demands of samples and consumption of test reagents are small, which thus reduces environment protection loads of laboratories and secondary pollution, and corresponds to development trends of modern analysis technologies. In the prior art, the microfluidic chips for use in ASV heavy metal ion detection usually includes microfluidic layers and sensor layers containing electrodes required for electrochemical analysis, micro-channels are provided in the microfluidic layers, and the micro-channels serve as fluidic working areas for flowing of solutions to be measured, in the sensor layers there are matching electrodes, and during use, integrate the sensor layers in the microfluidic layers for detection. The micro-channels are designed to be thin layers, so as to reduce usage amounts of the sample test solutions and in the meanwhile improve working efficiency between the test solution and reaction face, correspondingly the electrodes are designed to be planar, matching with the thin layers of micro-channels. Existing ASV heavy metal ion detection microfluidic chips are characterized by being of small dimensions, carrying ease, and high detection efficiencies in addition to being very sensitive and stable, make it possible to make quick on site in situ detection and are guiding the development trend of the ASV heavy metal ion detection. On the basis of the microfluidic chips for use in ASV heavy metal ion detection, it remains a technical problem as to how to further improve detection performance.

SUMMARY OF THE INVENTION

The present invention provides an electrode-modified heavy metal ion microfluidic detection chip and preparation method thereof, wherein porous nano $NiMn_2O_4$ is used to modify bare carbon electrodes in the all-solid-state planar electrodes to effectively improve sensitivity of trace amount lead and cadmium detection by the microfluidic chip.

To address the foregoing technical problem, embodiments of the present invention provide an electrode-modified heavy metal ion microfluidic detection chip, comprising a microfluidic module and a three-electrode sensor, wherein:

the microfluidic module comprises a micro-channel, an inlet duct and an outlet duct are provided at both ends of the at least one micro-channel; the three-electrode sensor comprises three all-solid-state planar electrodes provided on a card-shaped base plate, a working electrode, an auxiliary electrode and a reference electrode; one end of the three-electrode sensor is an interface area, terminals of leads of the three all-solid-state planar electrodes are arranged in the interface area as contacts; a sensor slot matching the three-electrode sensor is provided at a bottom portion of the micro-channel in the microfluidic module; when the three-electrode sensor is inserted in the sensor slot, the three all-solid-state planar electrodes are communicated with the micro-channel, the three-electrode sensor is assembled with the microfluidic module by being inserted into the sensor slot, and is detachable; the interface area is outside the sensor slot, during detection, connecting the contacts of each of the electrodes in the interface area with external connectors, applying voltage on the electrodes and detecting currents in circuits of the electrodes; the microfluidic module is a 3D printed transparent flexible piece, the micro-channel, the inlet duct, the outlet duct, and the sensor slot are integrally printed and formed along with the microfluidic module; the working electrode is a bare carbon electrode, and a surface thereof is modified by porous nano-$NiMn_2O_4$; the auxiliary electrode is an Ag electrode; and the reference electrode is an Ag/AgCl electrode.

As a preferred solution of the microfluidic module, the micro-channel is a saddle-type thin layer, wherein the inlet duct and the outlet duct are respectively connected at two ends of a saddle of the micro-channel and are extending along directions tangential to the saddle.

Preferably, an inlet duct nozzle and an outlet duct nozzle protruding from the microfluidic module are respectively provided at the inlet duct and the outlet duct, so as to ease connection with external ducts.

As a preferred solution of the three-electrode sensor, the interface area and the contacts are configured as per USB specifications, so that in the interface area at least one USB interface can be directly inserted, and the contacts can be communicated with leads of the at least one USB interface; as a standard USB interface has four parallel leads, when the interface area is connected with the at least one USB interface, ensure any three of the contacts contact any three of the leads, which can be selected according to actual requirements.

In an embodiment of the present invention, a method for preparing the electrode-modified heavy metal ion microfluidic detection chip, comprising the following steps:
1. Microfluidic module manufacturing: manufacturing the microfluidic module by PolyJet technology for 3D printing, wherein the micro-channel, the inlet duct, the outlet duct and the sensor slot are printed integrally together with the microfluidic module, and a printing material used is Vero Clear photopolymer resin;
2. Three-electrode sensor manufacturing: manufacturing the three-electrode sensor matching the microfluidic module by screen printing, taking at least one isolated card as a base plate, printing the three electrodes in different layers of the base plate, the working electrode, the auxiliary electrode and the reference electrode, wherein the terminals of the leads of the three electrodes are arranged at an end of the base plate and form an interface area; and modifying a surface of the working electrode with porous nano-$NiMn_2O_4$; and
3. Assembly of the microfluidic detection chip: plugging an end of the three-electrode sensor not in the interface area into the sensor slot to have the three electrodes communicating with the micro-channel, wherein the three-electrode sensor is tightly connected with the sensor slot, reserving the interface area outside the sensor slot for external connection, so as to assemble the microfluidic module and the three-electrode sensor to be the microfluidic detection chip.

As a preferred solution of step 2, manufacturing of the three-electrode sensor, the base plate is made of flexible PVC materials, wherein steps for screen printing of the three-electrode sensor are:
2.1 printing a bottom layer of an Ag layer of the three-electrodes and the leads on the base plate;
2.2 printing an Ag/AgCl layer on the Ag layer of the reference electrode;
2.3 printing a carbon layer on the leads of the three electrodes and the Ag layer of the working electrode; and
2.4 printing and covering insulated ink over areas on the base plate other than the three electrodes and a lead area.

As a preferred solution of step 2, manufacturing of the three-electrode sensor, steps for modifying the surface of the working electrode with the porous nano-$NiMn_2O_4$ comprises:

2.5 preparing the porous nano-$NiMn_2O_4$;
2.6 modifying the working electrode: fixing the porous nano-$NiMn_2O_4$ on the surface of the working electrode to modify the working electrode.

As a preferred solution of step 2.5, preparing the porous nano-$NiMn_2O_4$, specific steps of preparing the porous nano-$NiMn_2O_4$ comprise:
2.5.1 dissolving $MnCl_2.6H_2O$ 20 mmol/L, $NiCl_2.6H_2O$ 40 mmol/L, $Mn(NH_2)_2$ 120 mmol/L, and $NH_4F$ 0.1 g in ethanol 5 mL and deionized water 30 mL, stirring violently for 30 min;
2.5.2 cooling the solution to room temperature, cleaning reaction products with distilled water for at least 5 times, and drying the same; and
2.5.3 giving air annealing treatment to the reaction products at a tubular furnace at 2° C./min, preserving for 3 h at 350° C., so as to obtain porous nano-$NiMn_2O_4$ powder.

As a preferred solution of step 2.6, modifying the working electrode, specific steps of modifying the working electrode comprise:
2.6.1 adding the porous nano-$NiMn_2O_4$ powder in a methanol solution, giving ultrasound treatment to have the same dispersed evenly;
2.6.2 pipetting the solution 5 μL and dripping on a surface of the carbon layer of the working electrode, and drying the same at room temperature;
2.6.3 pipetting a Nafion solution of a mass percentage of 0.5% 5 μL, applying the same at the surface of the working electrode that has been dripped the porous nano-$NiMn_2O_4$, drying at room temperature for 3 h, and the porous nano-$NiMn_2O_4$ modified working electrode can be obtained.

The technical solutions of the present invention are based on microfluidic technologies, the microfluidic module with at least one micro-channel integrally 3D printed and the all-solid-state planar electrodes obtained by screen printing are assembled to be the heavy metal ion microfluidic detection chip, for use in measuring concentrations of heavy metal ions in a solution during ASV analysis, and the porous nano-$NiMn_2O_4$ is used to modify the bare carbon working electrode of the existing all-solid-state planar electrodes, and beneficial effects of the present invention are: without significantly increasing impedance of the working electrode, and maintaining good reversibility, the detection chip now has good linear response to lead and cadmium, detection sensitivity of trace amount lead and cadmium is substantially improved, for respectively more than 30% and 50%, the detection limits are as low as a half of existing bare carbon working electrode, and heavy metal ion detection performance of the microfluidic detection chip is efficiently enhanced.

DESCRIPTION OF PRIMARY ELEMENTS IN THE DRAWINGS

1—microfluidic module; 10—micro-channel; 11—sensor slot; 12—inlet duct; 131—inlet duct nozzle; 13—outlet duct; 131—outlet duct nozzle; 2—three-electrode sensor; 20—base plate; 21—working electrode; 22—auxiliary electrode; 23—reference electrode; 24—interface area; 240—contact; and 3—USB interface.

EMBODIMENTS

To make the technical problems to be solved by the present invention, the technical solutions and advantages of the present invention more clear, hereinafter a detailed description will be given in conjunction with the accompanying drawings and the embodiments.

Figure 1:
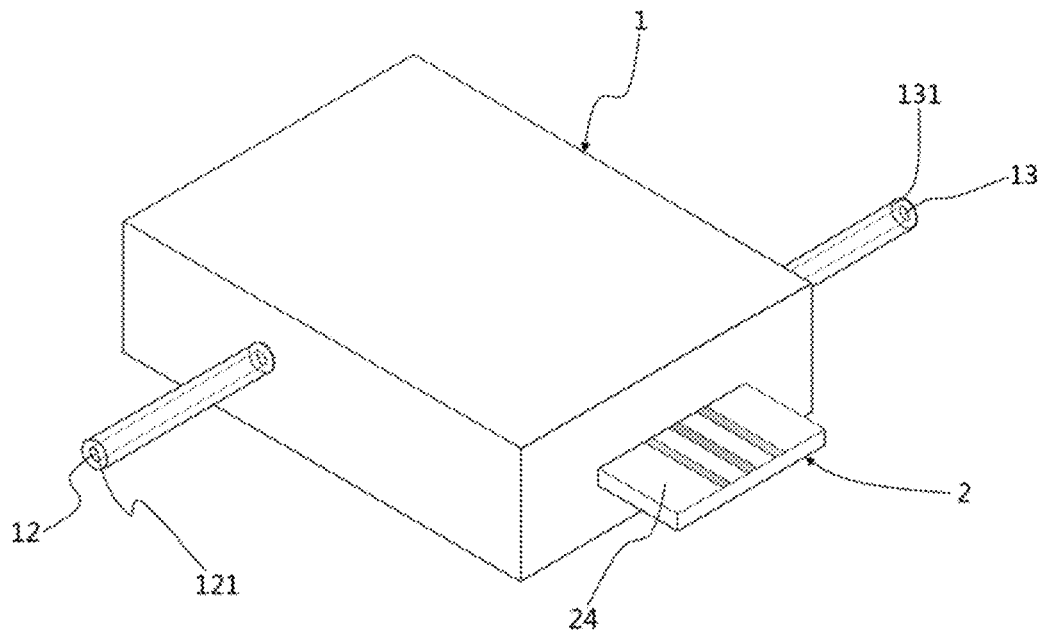
FIG. 1 is a structural diagram showing the heavy metal ion microfluidic detection chip provided in an embodiment of the present invention.
Figure 2:
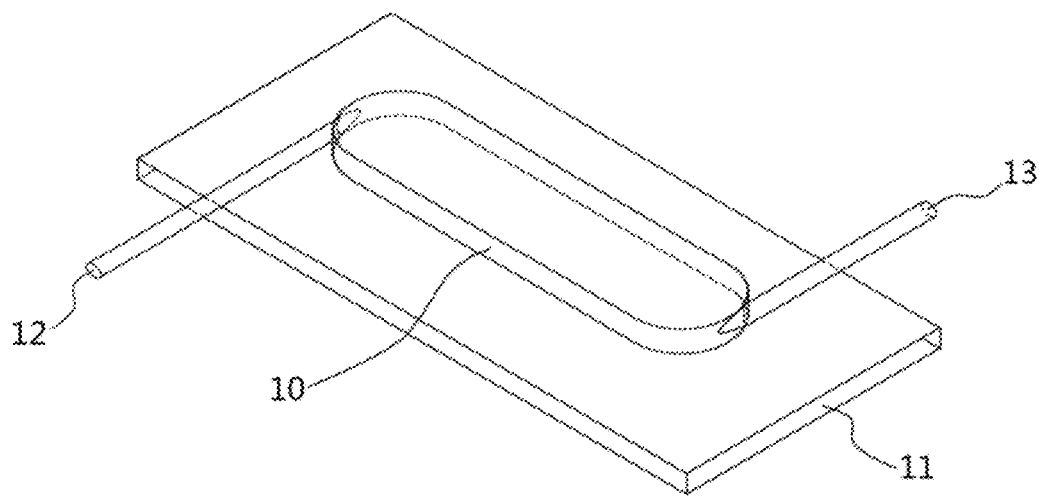
FIG. 2 is a structural diagram showing internal structures of the microfluidic module provided in an embodiment of the present invention.
Figure 3:
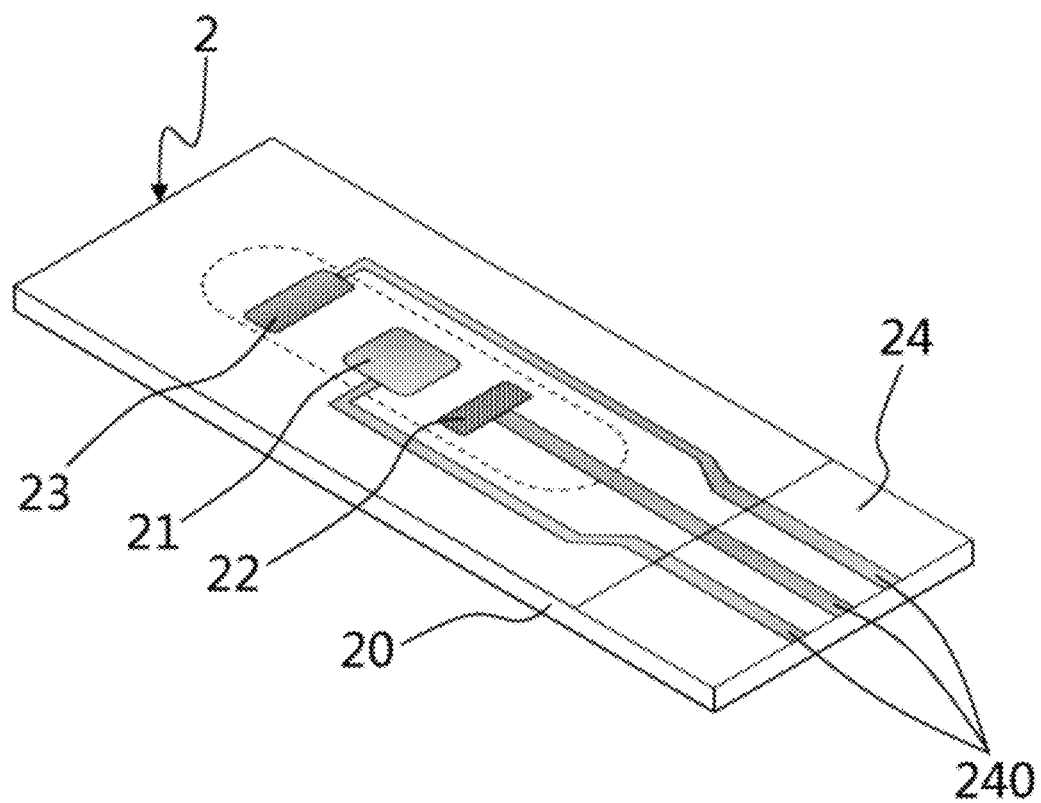
FIG. 3 is a structural diagram showing the three-electrode sensor provided in an embodiment of the present invention.
Figure 4:
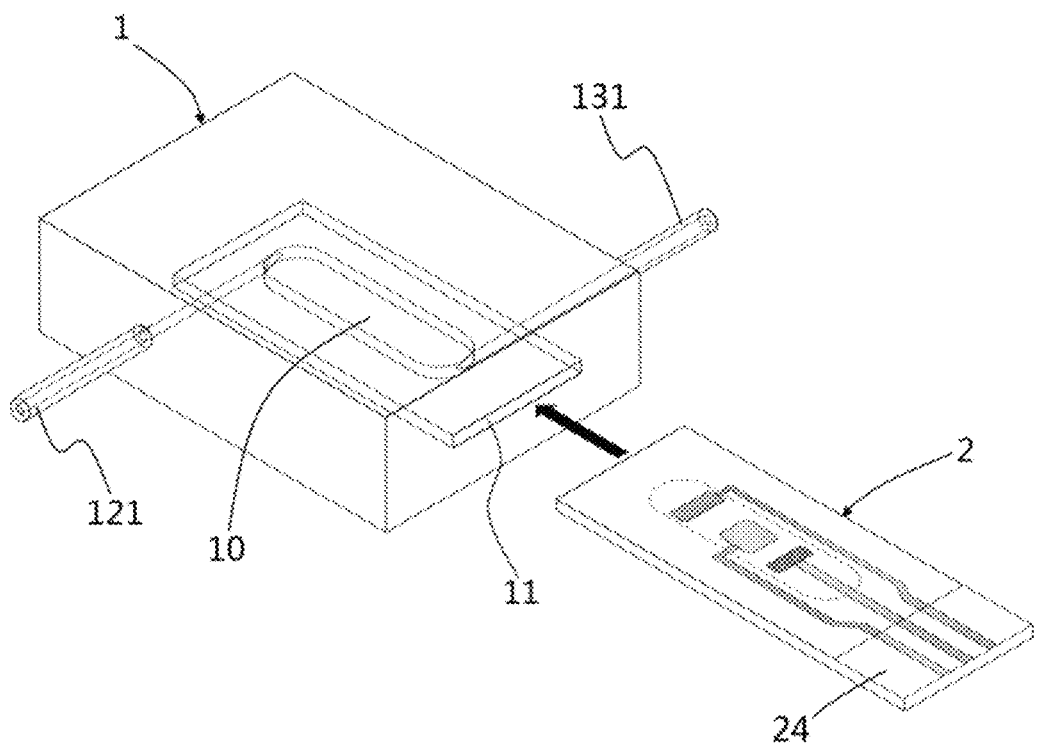
FIG. 4 is a diagram showing assembly of the three-electrode sensor and the microfluidic module provided in an embodiment of the present invention.

Targeting at the technical problem that detection performance of the microfluidic detection chip in ASV heavy metal ion detection in the prior art remains to be improved, the present embodiment of the present invention provides an electrode modified heavy metal ion microfluidic detection chip as shown in FIG. 1, wherein the microfluidic detection chips comprises a microfluidic module 1 and a three-electrode sensor 2 that engages with each other as shown in FIGS. 2-4, specific structures of the microfluidic module 1 and the three-electrode sensor 2 are as following:

As shown in FIG. 2, the microfluidic module 1 comprises at least one micro-channel 10, an inlet duct 12 and an outlet duct 13 communicating with external parts are provided at both ends of the at least one micro-channel 10; a sensor slot 11 matching the three-electrode sensor 2 is provided at a bottom portion of the at least one micro-channel 10 in the microfluidic module 1; the microfluidic module 1 is a 3D printed transparent flexible appliance, and a transparent detection window is provided on the microfluidic module 1 so as to monitor flowing conditions of liquids in the at least one micro-channel and reaction conditions at surfaces of the electrodes, in the meanwhile, being flexible makes it easier for the three-electrode sensor 2 and the sensor slot 11 to be connected tightly; all of the at least one micro-channel 10, the inlet duct 12, the outlet duct 13 and the sensor slot 11 in the microfluidic module 1 are integrally printed along with the microfluidic module 1, the entire microfluidic module 1 and internal structures thereof form a seamless entirely and risks of liquid leakage that may occur when different parts are joined together have been avoided.

As shown in FIG. 3, the three-electrode sensor 2 comprises three all-solid-state planar electrodes provided on a card-shaped substrate 20, the three electrodes are respectively a working electrode 21, an auxiliary electrode 22 and a reference electrode 23, an interface area 24 is provided at an end of the three-electrode sensor 2, and terminals of leads of the three all-solid-state planar electrodes are arranged in the interface area 24 as contacts 240;

As shown in FIG. 4, when the three-electrode sensor 2 is inserted in the sensor slot 11, the three all-solid-state planar electrodes are communicated with the at least one micro-channel 10, so that the three-electrode sensor 2 and the microfluidic module 1 can form the microfluidic detection chip; the three-electrode sensor 2 is detachable, and can be plugged into or removed from the sensor slot 11, it is only necessary to ensure tight connection between the three-electrode sensor 2 and the sensor slot 11, so that liquids in the at least one micro-channel 10 will not leak through a gap between the three-electrode sensor 2 and the sensor slot 11, and by plugging in and out, different sensors can be used to satisfy detection demands of multiple samples, and cross pollution among the samples will not occur; and the interface area 24 is reserved out of the sensor slot 11, during detection, connect contacts 240 of each of the electrodes in the interface area 24 with external connectors, so that voltage can be exerted on the electrodes, and currents in circuits of the electrodes can be measured.

Figure 5:
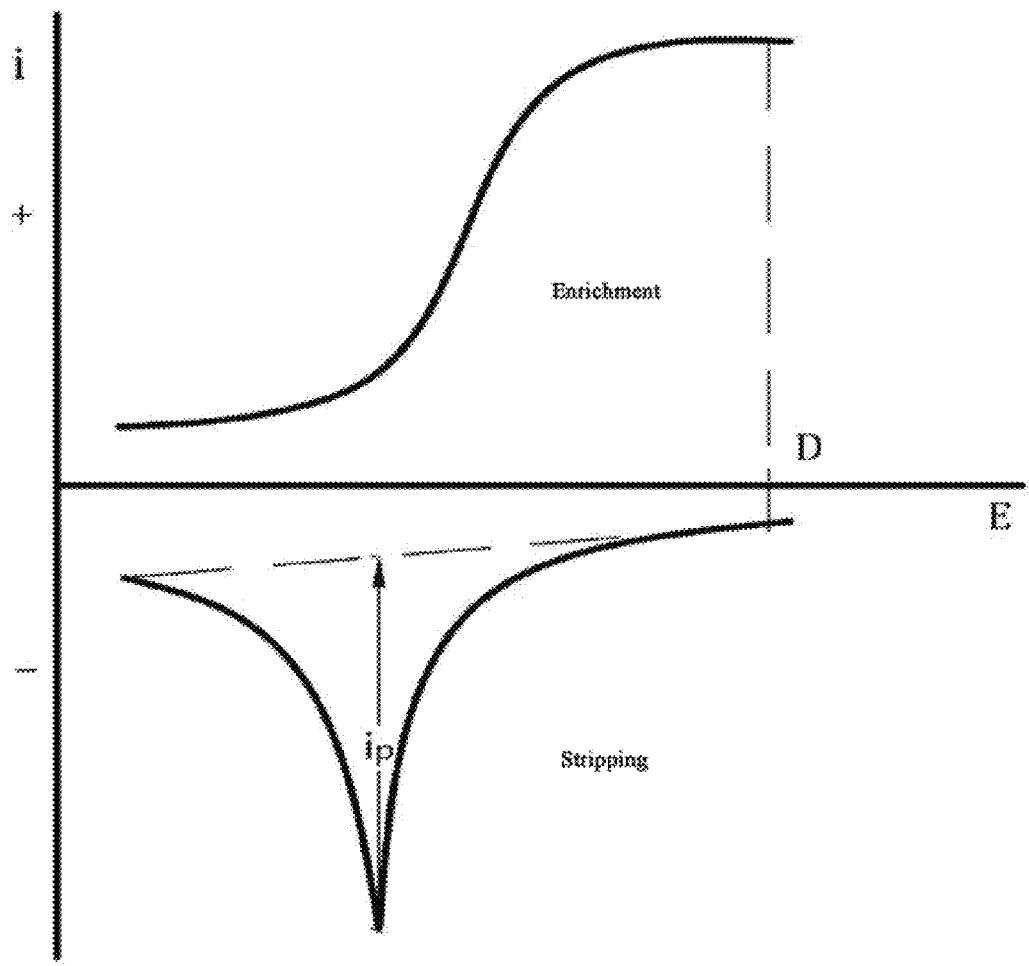
FIG. 5 is a diagram showing ASV detection principles.

In the three-electrode sensor 2, the working electrode 21 requires a small amount of resistance, and has a big specific surface, so that for the bottom layer, Ag with the strongest electric conductivity is chosen, cover a layer of nano-carbon on the Ag layer to form a bare carbon working electrode, and modify a surface thereof with porous nano-$NiMn_2O_4$. After modification, the working electrode can furnish the microfluidic detection chip with better linear response to lead and cadmium, and improve detection sensitivity of trace amount lead and cadmium significantly; the auxiliary electrode 22 requires a small amount of resistance, and comprises a bare Ag layer; the reference electrode 23 requires a stable electric potential, and comprises an Ag bottom layer and an Ag/AgCl layer covered on the Ag layer, wherein the electric potential is controlled by the Ag/AgCl layer; and a surface of the three-electrode sensor 2 is covered by a carbon layer except parts exposed in an insulation layer. The heavy metal ion microfluidic detection chip provided in the foregoing embodiment is used in ASV heavy metal ion detection. Viewing from working processes, ASV is an electrochemical analysis method that is very suitable for trace amount heavy metal detection, and detection steps thereof are divided into two processes, that is, reduction, pre-electrolytic enrichment and reverse oxidation, electrolysis and stripping, in FIG. 5 is shown a volt-ampere curve during ASC heavy metal ion detection, voltage applied is shown in the vertical axis E and current I measured is shown in the transverse axis; during detection, first of all, applying a negative voltage reduced at a predetermined value on a surface of the working electrode, metal ions with reduction potentials higher than the voltage will be reduced to be metallic elements and enrich on the surface of the working electrode, an enrichment amount is in direction correlation with voltage application time and concentrations of the metal ions, measuring the currents of the circuits of the electrodes and obtaining a volt-ampere curve of enrichment of a positive region along the vertical axis E in FIG. 5; thereafter, applying a forward scanning voltage on the working electrode, enriched metal elements will be re-oxidized to be ions and stripped, recording the currents and the potentials, and obtaining the volt-ampere curve of stripping in a negative area along the vertical axis E, obtaining a peak current $i_p$ of a μA grade or smaller from the volt-ampere curve of stripping, in case all operation conditions (electrolytic base solution, electrode, voltage applying parameters etc.) are controlled to be consistent, each metal has a specific oxidation or stripping peak potential, and a value of the peak current $i_p$ is in direct correlation with a concentration of the metal element in the solution to be measured, and based on this, qualitative and quantitative analysis of heavy metals in the solution can be analyzed.

A basic process of conducting detection of specific heavy metal ions in a solution by ASV analysis with the heavy metal ion microfluidic detection chip provided in the foregoing embodiment is:

1. Solution to be measured preparation: adding bismuth ion solution and acidic base solution in the solution containing heavy metal ions to be measured;
2. Detection platform assembly: connecting hoses respectively at the inlet duct and the outlet duct of the microfluidic module; providing a peristaltic pump on the hose connecting the inlet duct and communicating the same with a vessel containing the solution to be measured; discharging waste liquids via the hose connected with the outlet duct; connecting respectively the leads of the working electrode, the auxiliary electrode and the reference electrode at the interface area of the three-electrode sensor with leads of the working electrode WE, the reference electrode RE and the auxiliary electrode AE at the electrochemical working station;
3. Enrichment: applying negative voltage between the working electrode and the reference electrode by the electrochemical working station; starting the peristaltic pump, driving the solution to be measured to flow into the at least one micro-channel through the inlet duct, starting pre-electrolysis under action of the three electrodes, the heavy metal ions will enrich on a surface of the working electrode after being reduced to be metal elements, discharging the waste liquids; after pre-electrolysis, turning off the peristaltic pump and letting the solution to be measured stand;
4. Dissolution: applying a forward scanning voltage between the working electrode and the reference electrode by the electrochemical station, and the heavy metals enriched on the working electrode will be oxidized to be heavy metal ions and stripped out;
5. Collecting volt-ampere data: recording currents in circuits of the working electrode and the counter electrode and potentials of the working electrode, and obtaining a volt-ampere curve of stripping; obtaining a peak current $i_p$ of the solution to be measured from the volt-ampere curve for dissolution, comparing and calculating $i_p$ with a peak current of a standard test piece of a known concentration detected under the same conditions and obtaining concentrations of the specific heavy metal ions in the solution to be measured.

From the working process of the heavy metal ion microfluidic detection chip, it can be known that it is possible to optimize the heavy metal ion detection chip provided in the embodiments of the present invention to make it suitable for use in ASV detection, specifically:

To reduce a use amount of the solution to be measured, as a fluid working area, a dimension of the at least one micro-channel shall be as small as possible, the fluid working area shall be designed to be in the shape of a thin layer so as to improve working efficiencies of the three electrodes on solutions flowing through the micro-channel, therefore, as a preferred embodiment, the micro-channel 10 shall be processed to be a thin layer, a two-dimensional shape of the micro-channel 10 can be a saddle, a rectangle, a circle, an ellipse etc., the most commonly use shapes are the rectangle and the saddle, and by theoretical analysis and experimental test, the saddle-shaped thin micro-channel 10 as shown in figure works the best;

Connection positions between the inlet duct 12 and the outlet duct 13 and the micro-channel 10 and orientations of the nozzles can have different choices, and those that can facilitate smooth flowing of the solution to be measured through the micro-channel 10 are the best, as shown in FIG. 2, when the micro-channel 10 is a saddle-shaped thin layer, the inlet duct 12 and the outlet duct 13 are respectively connected at both end portions of the saddle of the micro-channel 10 and are extending along directions tangential to the end portions;

To ease connection of the inlet duct 12 and the outlet duct with external fluid ducts, as shown in FIG. 1, the inlet duct 12 and the outlet duct 13 are respectively provided with an inlet duct nozzle 121 and an outlet duct nozzle 131 for use in connection with fluid ducts such as hoses protruding out of a surface of the microfluidic module 1;

To ease observation of flowing conditions of liquids in the micro-channel and reaction conditions at the surfaces of the electrodes during detection in real time, the microfluidic module 1 is manufactured with transparent materials;

As a preferred choice of the microfluidic module, the micro-channel 10 is a saddle-shaped thin layer, the inlet duct 12 and the outlet duct 13 are respectively connected at two end portions of the saddle of the micro-channel 10, and are extending along directions tangential to the end portions.

Preferably, the inlet duct 12 and the outlet duct 13 are respectively provided with an inlet duct nozzle 121 and an outlet duct nozzle 131 protruding out of the microfluidic module 1, for connection with external fluid ducts.

Preferably, the microfluidic module 1 is made of transparent materials, so that a transparent detection window is present in the microfluidic module 1 so as to monitor in real time working conditions during detection.

Figure 6:
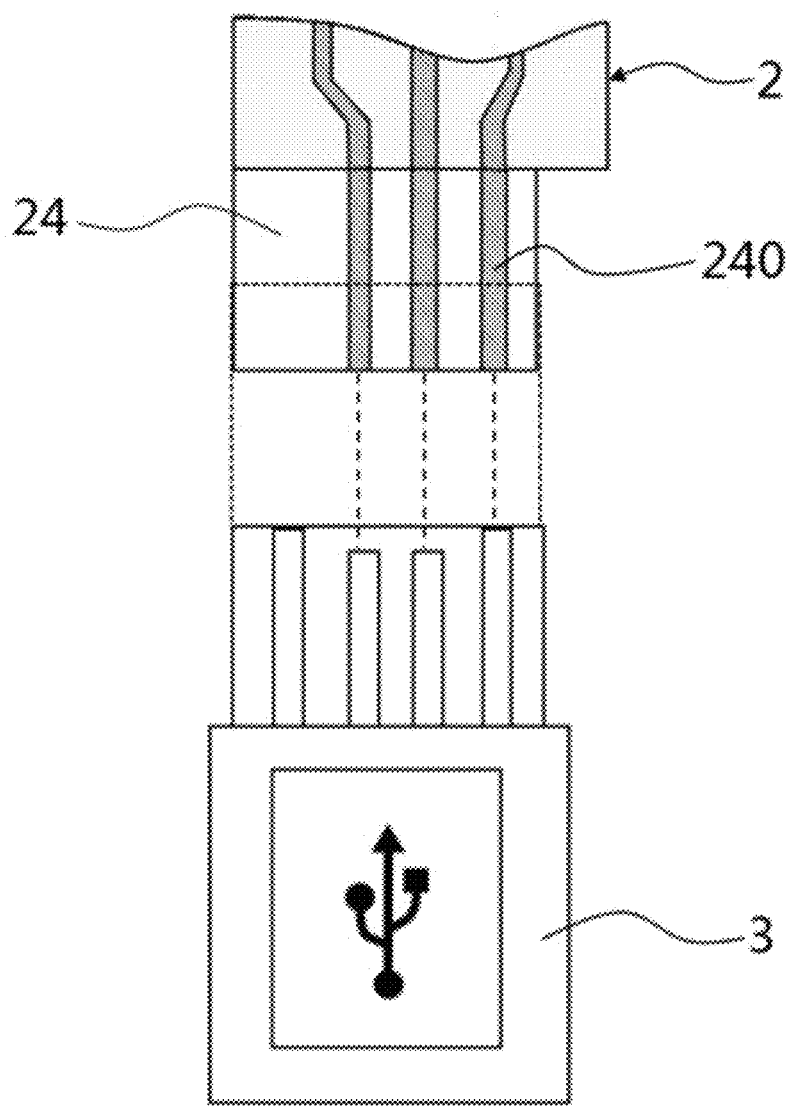
FIG. 6 is a diagram showing connection between the interface area of the three-electrode sensor and the USB interface.

As a preferred choice of the three-electrode sensor 2, the interface area 24 and the contacts 240 are configured as per USB standards, so that standard USB ports can be directly inserted into the interface area 24, and the contacts 240 can be corresponding communicated with leads of the standard USB ports; as a standard USB port has four parallel leads, when the interface area 24 is connected with the USB port, just have three leads contacts 240 contact sequentially any three leads among the four leads of the standard USB port, as shown in FIG. 6, the three contacts 240 correspond respectively to three neighboring leads at a right side of the USB port, and in actual working conditions, it is possible to design freely based on actual requirements.

Figure 7:
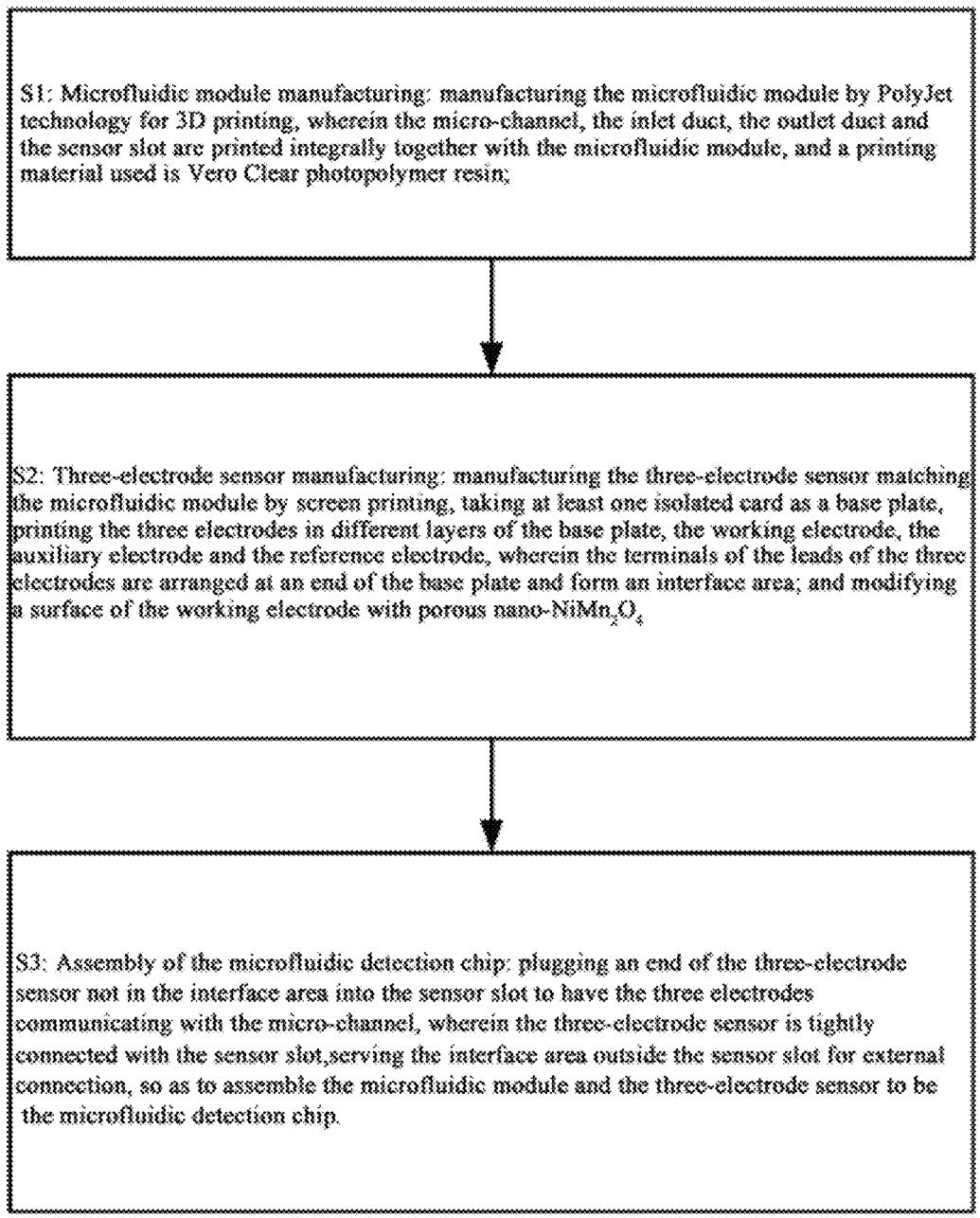
FIG. 7 is a flowchart diagram showing the preparation method of the heavy metal ion microfluidic detection chip provided in an embodiment of the present invention.

To better realize the foregoing technical solution, the present invention further provides a method for preparing the heavy metal ion microfluidic detection chip, wherein steps and processes of the method are shown in FIG. 7, comprising:

S1: manufacturing of the microfluidic module: manufacturing the microfluidic module by PolyJet technology for 3D printing, all of the micro-channel, the inlet duct, the outlet duct and the sensor slot are integrally printed together with the microfluidic module, and printing materials used are Vero Clear photopolymer resin;

S2: manufacturing of the three-electrode sensor: manufacturing the three-electrode sensor matching the microfluidic module by screen printing, taking as a base plate an insulation card, printing the three electrodes comprising the working electrode, the auxiliary electrode and the reference electrode in different layers on the base plate, terminals of leads of the three electrodes are arranged at an end of the base plate and an interface area is formed; and modifying a surface of the working electrode with porous nano-$NiMn_2O_4$; and S3: assembly of the microfluidic detection chip: inserting an end of the three-electrode senor that is not the interface area into the sensor slot, communicating the three electrodes with the micro-channel, connecting the three electrodes tightly with the sensor slot, reserving the interface area outside the sensor slot for use in external connection, and in this way, the microfluidic module and the three-electrode senor are assembled to be the microfluidic detection chip.

In step S1, 3D printing of the microfluidic module can be done with the Eden260vs 3D printer, by the PolyJet technology, in a Glossy printing mode it is possible to print microfluidic module appliances with high transparency and certain flexibility; PolyJet is a leading 3D printing technology, and working principles thereof are similar to the ink jet printers, photopolymer micro-drops are sprayed by the sprayer array, the ultraviolet light sources installed on the sprayer cure synchronously the micro-drops, and a printing layer is obtained; subsequently, the working station is reduced for a thickness of a layer and continues with manufacturing of the next layer. Accuracy of working pieces formed by the PolyJet technology is very high, with a planar accuracy as much as 40 μm and a thickness 16 μm, and PolyJet can be used to manufacture very complex and delicate models, and accuracy requirements of most microfluidic chips can be satisfied; specifically, during printing, a bulk material used for the microfluidic module is Vero Clear photopolymer resin, positions of internal structures can be printed together with the microfluidic module body integrally by using support materials, subsequently, removing the support material and empty internal structures in the microfluidic module can be obtained; the support materials are preferably FullCure 707 with good water solubility and after printing, removing the support materials by putting the printing piece in the water soluble support removing solution box.

In step S2, the three electrodes are printed in different layers on the base plate by screen printing, and an all-solid-state planar three-electrode sensor unit is obtained. The base plate for use in electrode screen printing can be flexible materials (such as PVC, PET, PC etc.) or rigid materials (glasses, ceramics etc.), and to ease batch printing, cutting, storage and transportation of the screen printed electrodes, as an embodiment of the present invention, a flexible PVC base plate is used to manufacture the planar electrodes, and a flexible base plate can promise that the electrode is working regularly when a radius of the bending curvature is small.

Figure 8:
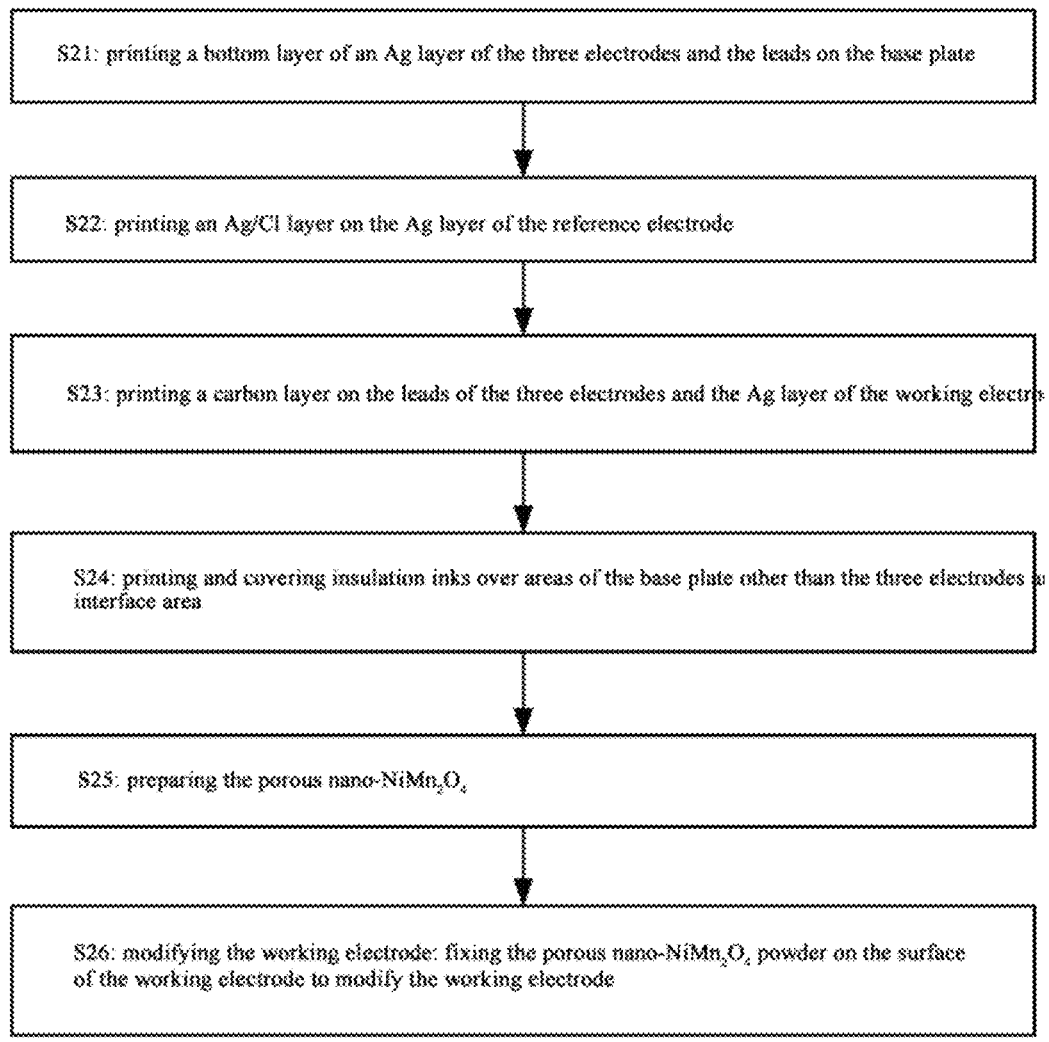
FIG. 8 is a flowchart diagram showing the manufacturing steps of the three-electrode sensor provided in an embodiment of the present invention.
Figure 9:
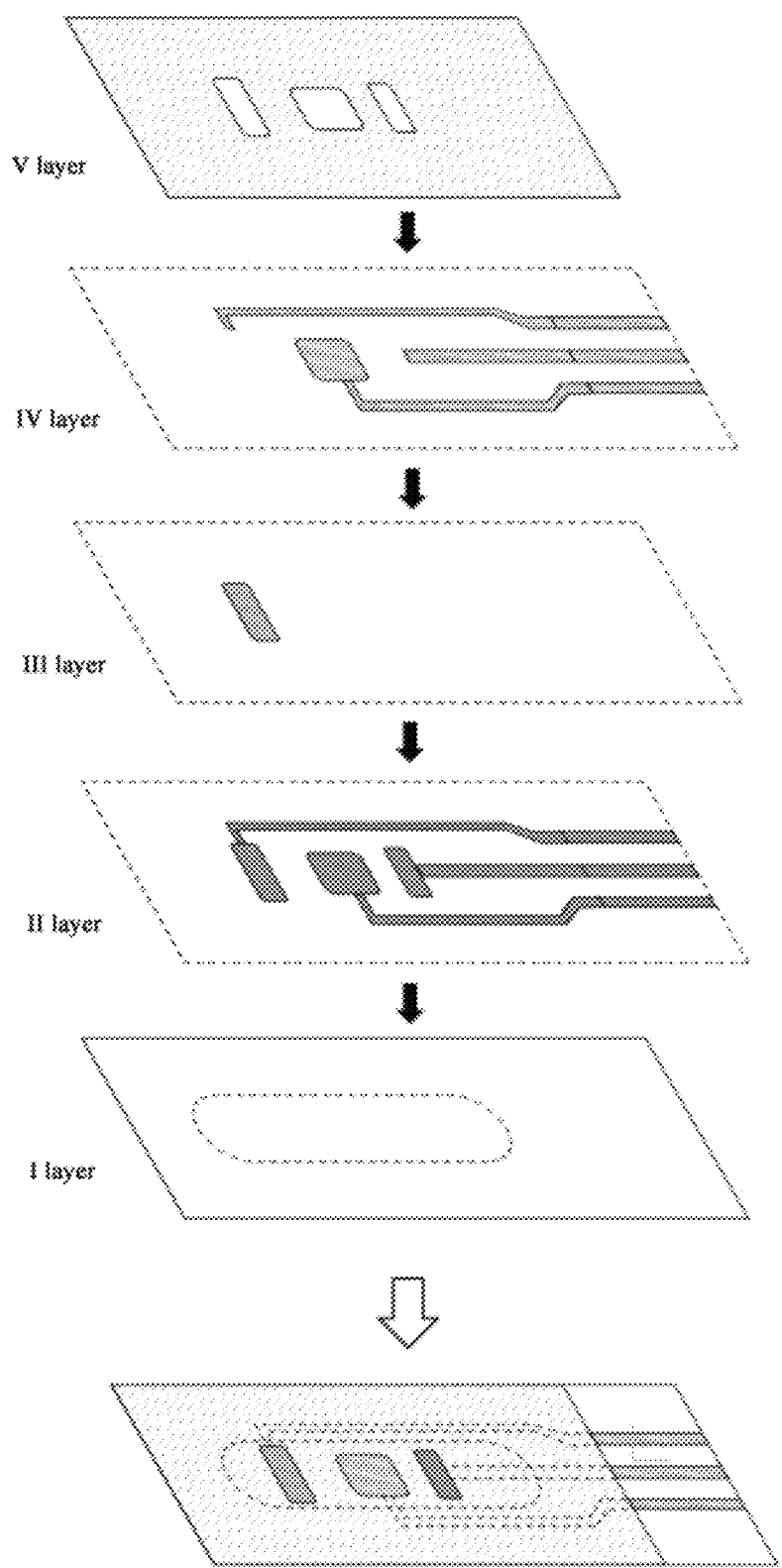
FIG. 9 is a diagram showing printing the three electrodes in different layers in the screen printing processes provided in an embodiment of the present invention.

In FIG. 8, in step S2, an instance of printing the three electrodes in different layers by screen printing and modifying the surface of the working electrode by porous nano-$NiMn_2O_4$ is shown, comprising specifically:

S21: printing a bottom layer of an Ag layer of the three electrodes and the leads on the base plate, a shape of the base plate is shown in layer I in FIG. 9, and a figure of the Ag layer is shown in layer II in FIG. 9;

S22: printing an Ag/Cl layer on the Ag layer of the reference electrode, a shape of the Ag/Cl layer is shown in layer III in FIG. 9;

S23: printing a carbon layer on the leads of the three electrodes and the Ag layer of the working electrode, and a shape of the carbon layer is shown in layer IV in FIG. 9;

S24: printing and covering insulation inks over areas of the base plate other than the three electrodes and the interface area, and a shape of the insulation layer is shown in layer V in FIG. 9;

S25: preparing the porous nano-$NiMn_2O_4$, and specific steps of an instance of the present step comprise:

S251: dissolving $MnCl_2 \cdot 6H_2O$ 20 mmol/L, $NiCl_2 \cdot 6H_2O$ 40 mmol/L, $Mn(NH_2)_2$ 120 mmol/L and $NH_4F$ 0.1 g in ethanol 5 mL and deionized water 30 mL, agitating for 30 min;

S252: cooling the solution to room temperature, cleaning reaction products for at least 5 times and drying the same;

S253: air annealing the reaction products at a tubular furnace at 2° C./MIN, maintaining at 350° C. for 3 h, and obtaining porous nano-$NiMn_2O_4$ powder;

S26: modifying the working electrode: fixing the porous nano-$NiMn_2O_4$ powder on the surface of the working electrode to modify the working electrode, and steps of a specific instance of the step comprise:

S261: adding the porous nano-$NiMn_2O_4$ powder in a methanol solution, giving ultrasound treatment to disperse the powder evenly;

S262: pipetting 5 μL of the solution to a surface of the carbon layer of the working electrode, drying the same at room temperature; and S263: pipetting Nafion solution 5 μL at a mass percentage of 0.5% and dripping and applying the same on the surface of the working electrode that has been applied the porous nano-$NiMn_2O_4$, drying at room temperature for 3 h, and the working electrode modified by the porous nano-$NiMn_2O_4$ can be obtained.

By modifying the working electrode on the three-electrode sensor with porous nano-$NiMn_2O_4$, replacing the three-electrode sensor in the microfluidic detection chip, and observing performance differences between the modified working electrode and the bare carbon working electrode in heavy metal ion detection of the microfluidic detection chip, it is found that, after modifying the surface of the planar electrode with porous nano-$NiMn_2O_4$ powder by Nafion, impedance of the working electrode has not increased significantly, good reversibility is maintained, good linear response to trace amount lead and cadmium is present, sensitivity has been improved for over 30% and over 50%, the detection limit is as low as a half of the bare carbon electrode and performance of the microfluidic detection chip is substantially improved.

In the foregoing embodiments of the present invention, common knowledge such as well-known specific structures and features has not been elaborated; each embodiment is described in a progressive manner, and the technical features involved in each embodiment can be mutually combined when no contradiction will be resulted in, and the same and similar parts of each embodiment can be referred to each other.

In the description of the present invention, orientations or positional relationships indicated by terms "upper", "lower", "bottom", etc. are based on the orientations or positional relationships shown in the accompanying drawings, and are only for the convenience of describing the present invention and simplifying the description, without indicating or implying that the indicated device or element must have a particular orientation, be constructed and operate in a particular orientation and should not be construed as a limitation of the invention.

The above embodiments are only used to illustrate the technical solutions of the present invention and not to limit them. Although the present invention has been described in detail with reference to the above embodiments, those of ordinary skill in the art can still modify or make equivalent replacement to specific embodiments of the present invention, and any modification and equivalent replacement that doesn't depart from spirits and the scope of the present invention shall fall into the protection scope defined by the claims of the present invention.

The invention claimed is:

1. An electrode-modified heavy metal ion microfluidic detection chip, including a microfluidic module (1) and a three-electrode sensor (2), wherein:
the microfluidic module (1) comprises a micro-channel (10), an inlet duct (12) and an outlet duct (13) are provided at opposite ends of the at least one micro-channel (10); the three-electrode sensor (2) comprises three all-solid-state planar electrodes provided on a card-shaped base plate (20), a working electrode (21), an auxiliary electrode (22) and a reference electrode (23); one end of the three-electrode sensor (2) is an interface area (24), contacts (240) at terminals of leads of the three all-solid-state planar electrodes are arranged in the interface area; a sensor slot (11) matching the three-electrode sensor (2) is provided at a bottom portion of the micro-channel (10) in the microfluidic module (1); when the three-electrode sensor (2) is inserted in the sensor slot (11), the three all-solid-state planar electrodes are communicated with the micro-channel (10), the three-electrode sensor (2) is assembled with the microfluidic module (1) by being inserted into the sensor slot (11), and is detachable; the interface area (24) is outside the sensor slot (11);
the microfluidic module (1) is a 3D printed transparent flexible piece, the micro-channel (10), the inlet duct (12), the outlet duct (13), and the sensor slot (11) are integrally printed and formed on with the microfluidic module (1); the working electrode (21) is a bare carbon electrode, and a surface thereof is modified by porous nano-$NiMn_2O_4$; the auxiliary electrode (22) is an Ag electrode; and the reference electrode (23) is an Ag/AgCl electrode;
wherein preparing the porous nano-$NiMn_2O_4$, specific steps of preparing the porous nano-$NiMn_2O_4$ include:
dissolving $MnCl_2 \cdot 6H_2O$ 20 mmol/L, $NiCl_2 \cdot 6H_2O$ 40 mmol/L, $Mn(NH_2)_2$ 120 mmol/L, and $NH_4F$ 0.1 g in ethanol 5 mL and deionized water 30 mL, stirring violently for 30 min;
cooling the solution to room temperature, cleaning reaction products with distilled water for at least 5 times, and drying the same; and
giving air annealing treatment to the reaction products at a tubular furnace at 2° C./min, preserving for 3 h at 350° C., so as to obtain porous nano-$NiMn_2O_4$ powder.

2. The electrode-modified heavy metal ion microfluidic detection chip according to claim 1, wherein the micro-channel (10) is a saddle shaped thin layer, wherein the inlet duct (12) and the outlet duct (13) are respectively connected at two ends of a saddle of the micro-channel (10) and are extending along directions tangential to the saddle.

3. The electrode-modified heavy metal ion microfluidic detection chip according to claim 2, wherein the interface area (24) and the contacts (240) are configured as per USB specifications, so that in the interface area (24) at least one USB interface (3) can be directly inserted, and the contacts (240) can be communicated with leads of the at least one USB interface (3); as a USB interface has four parallel leads, when the interface area (24) is connected with the at least one USB interface (3), ensure any three of the contacts (240) contact any three of the leads.

4. The electrode-modified heavy metal ion microfluidic detection chip according to claim 1, wherein an inlet duct nozzle (121) and an outlet duct nozzle (131) protruding from the microfluidic module (1) are respectively provided at the inlet duct (12) and the outlet duct (13), so as to ease connection with external ducts.

5. The electrode-modified heavy metal ion microfluidic detection chip according to claim 4, wherein the interface area (24) and the contacts (240) are configured as per USB specifications, so that in the interface area (24) at least one USB interface (3) can be directly inserted, and the contacts (240) can be communicated with leads of the at least one USB interface (3); as a USB interface has four parallel leads, when the interface area (24) is connected with the at least one USB interface (3), ensure any three of the contacts (240) contact any three of the leads.

6. The electrode-modified heavy metal ion microfluidic detection chip according to claim 1, wherein the interface area (24) and the contacts (240) are configured as per USB specifications, so that in the interface area (24) at least one USB interface (3) can be directly inserted, and the contacts (240) can be communicated with leads of the at least one USB interface (3); as a USB interface has four parallel leads, when the interface area (24) is connected with the at least one USB interface (3), ensure any three of the contacts (240) contact any three of the leads.

7. A method for preparing the electrode-modified heavy metal ion microfluidic detection chip according to claim 1, wherein the method for preparing the electrode-modified heavy metal ion microfluidic detection chip, comprising the following steps:
microfluidic module manufacturing: manufacturing the microfluidic module by 3D printing, wherein the micro-channel, the inlet duct, the outlet duct and the sensor slot are printed integrally together with the microfluidic module, and a printing material used is photopolymer resin;
three-electrode sensor manufacturing: manufacturing the three-electrode sensor matching the microfluidic module by screen printing, taking at least one isolated card as a base plate, printing the three electrodes in different layers of the base plate, the working electrode, the auxiliary electrode and the reference electrode, wherein the terminals of the leads of the three electrodes are arranged at an end of the base plate and form an interface area; and modifying a surface of the working electrode with porous nano-$NiMn_{2O4}$; and assembly of the microfluidic detection chip: plugging an end of the three-electrode sensor not in the interface area into the sensor slot to have the three electrodes communicating with the micro-channel, wherein the three-electrode sensor is tightly connected with the sensor slot, reserving the interface area outside the sensor slot for external connection, so as to assemble the microfluidic module and the three-electrode sensor to be the microfluidic detection chip.

8. The method for preparing the electrode-modified heavy metal ion microfluidic detection chip according to claim 7, wherein in manufacturing of the three-electrode sensor, the base plate is made of flexible PVC materials, wherein steps for screen printing of the three-electrode sensor are:
printing a bottom layer of an Ag layer of the three-electrodes and the leads on the base plate;
printing an Ag/AgCl layer on the Ag layer of the reference electrode;

printing a carbon layer on the leads of the three electrodes and the Ag layer of the working electrode; and printing and covering insulated ink over areas on the base plate other than the three electrodes and a lead area.

9. The method for preparing the electrode-modified heavy metal ion microfluidic detection chip according to claim 7, wherein manufacturing of the three-electrode sensor, steps for modifying the surface of the working electrode with the porous nano-$NiMn_2O_4$ comprises:

preparing the porous nano-$NiMn_2O_4$;

modifying the working electrode: fixing the porous nano-$NiMn_2O_4$ on the surface of the working electrode to modify the working electrode.

\* \* \* \* \*